(12) United States Patent
Craig et al.

(10) Patent No.: US 8,352,873 B2
(45) Date of Patent: Jan. 8, 2013

(54) MEDIA CONTENT AND CHAT INTEGRATION

(75) Inventors: James P. Craig, San Francisco, CA (US); Eric M. Circlaeys, Paris (FR); Kjell Bronder, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 462 days.

(21) Appl. No.: 12/135,064

(22) Filed: Jun. 6, 2008

(65) Prior Publication Data

US 2009/0307614 A1 Dec. 10, 2009

(51) Int. Cl.
*G06F 3/048* (2006.01)

(52) U.S. Cl. .......................... 715/758; 715/230

(58) Field of Classification Search .................. 715/758, 715/751, 781; 709/204, 248, 227
See application file for complete search history.

(56) References Cited

U.S. PATENT DOCUMENTS

| | | | |
|---|---|---|---|
| 5,701,153 A | 12/1997 | Reichek et al. | |
| 5,832,171 A | 11/1998 | Heist | |
| 6,229,572 B1 | 5/2001 | Ciardullo et al. | |
| 6,282,404 B1 | 8/2001 | Linton | |
| 6,529,234 B2 | 3/2003 | Urisaka et al. | |
| 6,611,822 B1 * | 8/2003 | Beams et al. | 706/11 |
| 6,801,663 B2 | 10/2004 | Matsushita et al. | |
| 6,993,513 B2 * | 1/2006 | Beams et al. | 706/47 |
| 7,047,279 B1 * | 5/2006 | Beams et al. | 709/204 |
| 7,207,041 B2 | 4/2007 | Elson et al. | |
| 7,213,051 B2 * | 5/2007 | Zhu et al. | 709/205 |
| 7,660,416 B1 | 2/2010 | Kline | |
| 7,702,821 B2 | 4/2010 | Feinberg et al. | |
| 7,716,376 B1 * | 5/2010 | Price et al. | 709/248 |
| 8,055,708 B2 | 11/2011 | Chitsaz et al. | |
| 2002/0147777 A1 * | 10/2002 | Hackbarth et al. | 709/205 |
| 2003/0023686 A1 * | 1/2003 | Beams et al. | 709/205 |
| 2003/0028782 A1 * | 2/2003 | Grundfest | 713/182 |
| 2003/0093790 A1 * | 5/2003 | Logan et al. | 725/38 |
| 2004/0009813 A1 * | 1/2004 | Wind | 463/30 |
| 2004/0098754 A1 * | 5/2004 | Vella et al. | 725/135 |
| 2004/0158869 A1 | 8/2004 | Safran et al. | |
| 2004/0205091 A1 * | 10/2004 | Mulcahy et al. | 707/204 |

(Continued)

OTHER PUBLICATIONS

Hain et al. Automatic Transcription of Conversational Telephone Speech. IEEE Transactions on Speech and Processing, vol. 13, No. 6, Nov. 2005.*

(Continued)

*Primary Examiner* — Tuyetlien Tran
*Assistant Examiner* — Amy M Levy
(74) *Attorney, Agent, or Firm* — Schwegman Lundberg & Woessner, P.A.

(57) ABSTRACT

In various embodiments, a method includes receiving a request to initiate recording of media content of an event. The method also includes controlling capturing of the media content by a capture machine in response to the received request. The method includes opening a chat session among one or more persons that are listeners or viewers of the event being captured, wherein the opening is in response to the request to initiate recording of the media content. The chat session comprises one or more entries that include a chat input from the one or more persons and a timecode of the chat input. The method includes receiving a request to stop recording of the media content of the event. The method also includes combining at least a subset of the one or more entries of the chat session with the media content using the time code of the one or more entries.

17 Claims, 11 Drawing Sheets

U.S. PATENT DOCUMENTS

| | | | |
|---|---|---|---|
| 2004/0220791 A1* | 11/2004 | Lamkin et al. | 703/11 |
| 2004/0249650 A1* | 12/2004 | Freedman et al. | 705/1 |
| 2005/0044499 A1 | 2/2005 | Allen et al. | |
| 2007/0143762 A1 | 6/2007 | Arnold et al. | |
| 2007/0162953 A1 | 7/2007 | Bolliger et al. | |
| 2007/0192408 A1 | 8/2007 | Konig | |
| 2008/0005240 A1* | 1/2008 | Knighton et al. | 709/204 |
| 2008/0092168 A1* | 4/2008 | Logan et al. | 725/44 |
| 2009/0037524 A1 | 2/2009 | O'Rourke et al. | |

OTHER PUBLICATIONS (Dictionary.com, "superimpose," in Collins English Dictionary—Complete & Unabridged 10th Edition. Source location: HarperCollins Publishers. http://dictionary.reference.com/browse/superimpose. Available: http://dictionary.reference.com. Accessed: Jan. 27, 2012).*

"U.S. Appl. No. 12/118,304, Advisory Action mailed May 6, 2011", 3 pgs.

"U.S. Appl. No. 12/118,304, Final Office Action mailed Feb. 16, 2011", 27 pgs.

"U.S. Appl. No. 12/118,304, Final Office Action mailed Apr. 10, 2012", 31 pgs.

"U.S. Appl. No. 12/118,304, Non Final Office Action mailed Sep. 6, 2011", 25 pgs.

"U.S. Appl. No. 12/118,304, Non-Final Office Action mailed Jun. 1, 2010", 22 pgs.

"U.S. Appl. No. 12/118,304, Response filed Feb. 6, 2012 to Non Final Office Action mailed Sep. 6, 2011", 16 pgs.

"U.S. Appl. No. 12/118,304, Response filed Dec. 1, 2010 to Non Final Office Action mailed Jun. 1, 2010", 19 pgs.

"U.S. Appl. No. 12/118,304, Response filed Apr. 18, 2011 to Final Office Action mailed Feb. 16, 2011", 16 pgs.

"U.S. Appl. No. 12/118,304, Response filed Aug. 16, 2011 to Advisory Action mailed May 16, 2011", 20 pgs.

* cited by examiner ically assigned to user based on a login of such user (username and password)) to a chat session.

MEDIA CONTENT AND CHAT INTEGRATION

COPYRIGHT

A portion of the disclosure of this document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software, data, and/or screenshots which may be described below and in the drawings that form a part of this document: Copyright 2008, Apple® Inc. All Rights Reserved.

BACKGROUND

Different type of multimedia (such as video and audio) may be captured and stored for subsequent playback. In particular, video or audio may be captured for subsequent playback for those persons unable to listen or view the actual live event. For example, professors at educational institutions may record their lectures so that students unable to attend the live lectures are able to subsequently view and/or listen at a later time.

BRIEF DESCRIPTION OF THE DRAWINGS

The embodiments are provided by way of example and not limitation in the figures of the accompanying drawings, in which like references indicate similar elements and in which.

DETAILED DESCRIPTION

Methods, apparatus and systems for integrating media content and chat data are described. In the following description, numerous specific details are set forth. However, it is understood that embodiments of the invention may be practiced without these specific details. In other instances, structures and techniques have not been shown in detail in order not to obscure the understanding of this description.

Figure 1:
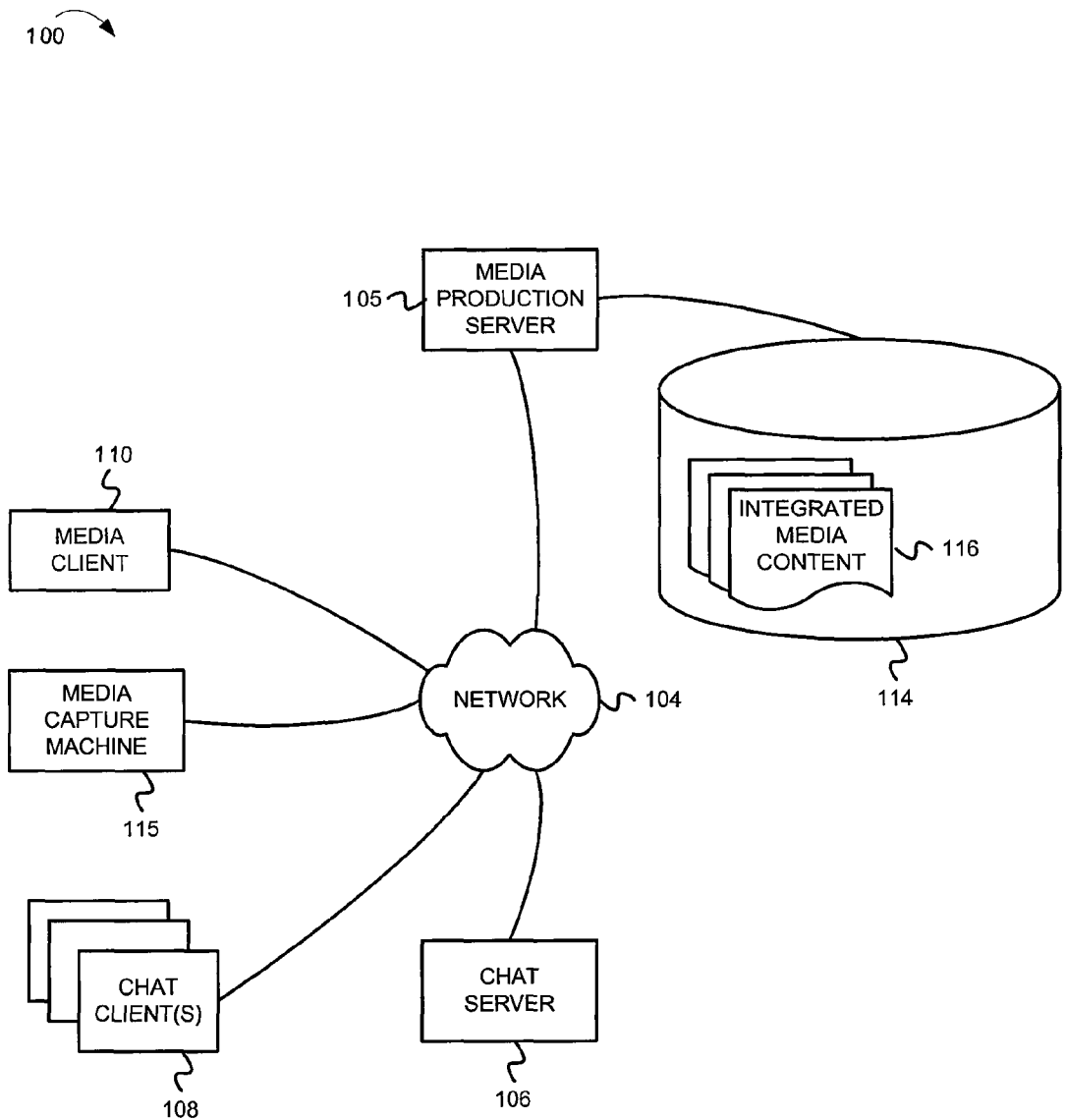
FIG. 1 is a system diagram for integration of chat data with media content, according to some example embodiments.

FIG. 1 is a system diagram for integration of chat data with media content, according to some example embodiments. In particular, FIG. 1 illustrates a system 100 that includes a media production server 105, a media client 110, a media capture machine 115, a chat server 106 and chat client(s) 108, which are operatively coupled together through a network 104. The media production server 105 is also operatively coupled to a machine-readable medium 114 that stores integrated media content 116.

The media production server 105 is a system or apparatus in a client-server relationship with one or more entities to produce a media representation of an event. In some example embodiments, the media representation includes integrated data from a chat from one or more users that view or listen to the media representation (either real time relative to the recording of the event or subsequent to such recording).

Thus, the media production server 105 may operate to control media capture of the event and associated chat data, processing of media content from the capture activity and the chat data, publishing the processed media content and chat data, or other associated activities. In some example embodiments, the media production server 105 can operatively communicate with the media client 110 and the media capture machine 115. The media production server 105 can control the operation of the media capture machine 115 and manage the post-processing of media content generated by the media capture machine 115. The media production server 105 may also operate to control the chat server 106 for production of chat data that is integrated with the produced media content. In particular, the chat server 106 may initiate a chat session among one or more users (using the chat client(s) 108) that are viewing or listening to the media representation.

Post-processing refers to operations on the media content captured by a media capture machine and the chat data of a chat session from the chat server 106. The media content may include video and audio content, video only content, audio only content, or other content that may be incorporated in a presentation. The chat data may be any combination of text, images, video, audio, links to text, images, video, audio, etc. In some example embodiments, the chat data may include chat input that is stored in a chat log and other types of data (such as images, video, audio, links to text, links to images, links to video, links to audio, etc.) that are processed by a chat bot application executing on a chat server. One example of chat data may relate to a user that input an entry. In particular, a user's username may be included as part of a chat entry (as further described below). Based on the user's username, other data regarding the user (such as the user's full name, email address, their image, etc. may be retrieved for incorporation into the chat data. For example, such data may be retrieved from some type of directory system that stores such data regarding the users that are inputting chat data. This additional data regarding a user may be part of the chat entries that the user input. In one such application, this additional data regarding the user could be integrated with the media content. For example, an image of the user may be displayed along with their associated chat data that is integrated with the media content.

The media capture machine 115 may be one of a plurality of media capture machines controllable by media production server 105. The media capture machine 115 may be structured as a media capture system having a device to capture the media event and a control mechanism to interact with systems external to the device. In some example embodiments, the media client 110 initiates the start of a media capture event by the media capture machine 115 under the control of the media production server 105 and coordinates the submission of media content generated in the media capture event to the media production server 105. In some example embodiments, the chat server 106 initiates the start of a chat session among one or more chat client(s) 108 under the control of the media production server 105 and coordinates the submission of the chat data from the chat session to the media production server 105. The chat session may or may not be initiated in coordination with the initiation of the recording of the event. For example, the chat session may be initiated in response to viewing of a past recording of media content.

In some example embodiments, communication between the media production server 105 and the media capture machine 115 and the chat server 106 can be performed in a secure manner. For example, an encryption key or secret for the communication is obtained by the media client 110 for use by the media capture machine 115. In some example embodiments, the machine-readable medium 114 includes tangible volatile and/or non-volatile media (e.g., read only memory (ROM), random access memory (RAM), magnetic disk storage media, optical storage media, flash memory devices, etc.). The machine-readable medium 114 may store the integrated media content 116 that was a result of post processing of the media content and the chat data. Moreover, while not shown, the machine-readable medium 114 may store the recorded media content and the chat data, which are combined to produce the integrated media content 116.

While the system 100 shown in FIG. 1 employs a client-server architecture, embodiments are not limited to such an architecture, and could equally well find application in a distributed, or peer-to-peer, architecture system. The network communication may occur as part of any combination of wired and wireless communication. In some embodiments, network communication may be based on one or more communication protocols (e.g., HyperText Transfer Protocol (HTTP), HTTP Secured (HTTPS), Real Time Messaging Protocol (RTMP), Real Time Messaging Protocol Secured/SSL (RTMPS), etc.). Further, FIG. 1 illustrates the components in the system 100 being coupled together over a network. As further described below, these different components perform different operations for integration of media content with chat data. However, some embodiments are not so limited. In particular, in some other embodiments, the operations across the different components could be performed on a lesser number of components that may or may not be coupled together over a network. For example, in some example embodiments, a single component could perform the operations for capturing and integrating the media content with the chat data as described below.

Embodiments may be incorporated into a number of different applications. In some applications, the media content is captured video, wherein viewers of the video are creating the chat data that is integrated into the media content. For example, one application relates to providing a cost effective approach for closed-captioning of a video podcast. For example, professors at some educational institutions are making their lectures available via a video podcast after the lecture has occurred. Because of accessibility laws, including those under the Americans with Disabilities Act, these video podcasts may be required to include close captioning. Some example embodiments allow a transcriber to integrate close captioning of the lecture using a chat session. The data from the chat session may be integrated with the video to create a video podcast with close captioning. Moreover, such embodiments allow the transcribed data to be searchable for all subsequent viewers of the lectures. Alternatively or in addition, students, teaching assistants, etc. viewing the lecture may exchange data among themselves using a chat session while viewing the lecture. For example, students may exchange questions and answers about the lecture.

Another application could relate to foreign translation of the audio of a presentation. A translator could listen to media content (either live or recorded) and input the translation as chat data. Such data could then be integrated into the media content for display as caption or subtitle text. In some example embodiments, if the text is stored in the metadata of the media content, any number of translations may be stored therein. Accordingly, the caption or subtitle text could selectably be displayed depending on what language that viewer wants displayed. Moreover, one to any number of chat sessions may be occurring at any time. Thus, multiple translations may be occurring simultaneously at least in part.

For example, a first translator could create a first translation in a first chat session and a second translator could create a second translation in a second chat session. Both translations could be stored in the metadata for the media content. Viewer A of the integrated media content may selectably view the first translation (and not the second translation) in the subtitles, while viewer B of the integrated media content may selectably view the second translation (and not the first translation) in the subtitles. This selection may be an option available to the viewer of the integrated media content.

Thus, some example embodiments leverage the use of chat sessions for the integration of text, files, etc. into media content. In particular, as part of a chat session, in addition to the text, files, etc., the chat server also includes timecodes of when such data was input. Accordingly, these timecodes from the chat data can be used to incorporate the data from the chat into the associated media content. While described using chat data, some example embodiments may use text message logs, emails, etc. that would include timecodes that could be correlated with the associated media content.

Figure 2:
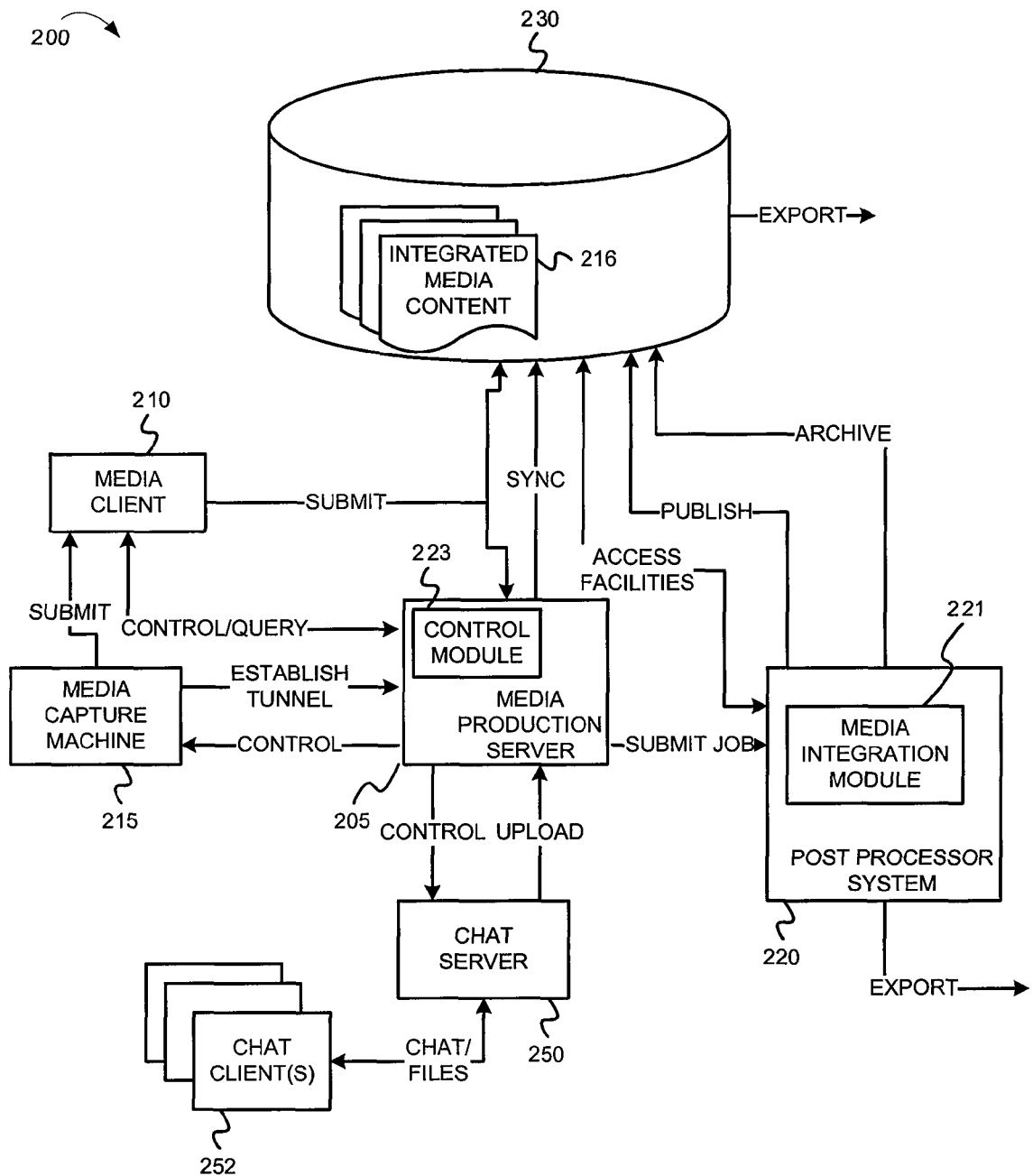
FIG. 2 is a diagram for flow of signals in a system for integration of chat data with media content, according to some example embodiments.

FIG. 2 is a diagram for flow of signals in a system for integration of chat data with media content, according to some example embodiments. An architecture 200 may be used in the system 100 of FIG. 1 in which the media production server 205 may be arranged as the media production server 105. The media production server 205 includes a control module 223. The post processor system 220 includes a media integration module 221. The control module 223 and the media integration module 221 may be software, hardware, firmware or a combination thereof for executing the various operations described herein, according to some example embodiments.

The media client 210 generates control and query signals to the control module 223 in the initiation phase of capturing a media event and processing the media content from the event. The media capture machine 215 establishes a communication tunnel with the control module 223, and the control module 223 uses the communication tunnel to generate commands to the media capture machine 215 to control the media capture event. The media capture machine 215 submits the captured media content to the media client 210. The media capture machine 215 may be configured as a machine to capture video and audio content, video only content, audio only content, or other content that may be incorporated in a presentation. The media client 210 submits the media content to a machine-readable medium 230, which may be arranged as the machine-readable medium 114 of FIG. 1. In some example embodiments, the machine-readable medium 230 may be some type of shared file system.

The control module 223 in the media production server 205 also communicates with a chat server 250. The control module 223 may control initiation and completion of a chat session by control communications transmitted to the chat server 250. The chat server 250 may create a chat session among one or more persons that are using the chat client(s) 252. The chat server 250 may create a chat data that was entered as part of the chat session. In some example embodiments, the one or more persons that are entering chat data as part of the chat session are also viewing or listening to the event being captured by the media capture machine 215. In some example embodiments, the chat session is occurring, at least in part, while the event is occurring. Alternatively, the one or more persons are entering chat data, while viewing or listening to a playback of the event that was previously captured by the media capture machine 215. In some example embodiments, as part of the creation of a chat session, the chat server 250 may also create a chat bot such that the chat server 250 is serving as another user in the chat session. In such embodiments, in addition to text input, the chat client(s) 252 may input different types of media as chat input into the chat session. Such data may be processed by the chat bot executing at the chat server 250. For example, the chat client(s) 252 may input files, images, video, audio or links thereto.

Thus, the one or more persons may input different types of data into the chat data. For example, the chat data may be any combination of text, files, images, video, audio, links to text, files, images, video, audio, etc. In some example embodiments, the chat data is comprised of a number of entries. An entry may include the data being input from the chat client 252, the user inputting the data and a timecode of when the data was input. The chat client(s) 252 may input the chat data which may be stored at the chat server 252. The chat server 250 may upload the chat data to the media production server 205. For example, the chat sever 250 may upload the chat data to the media production server 205 after the chat session is complete.

The control module 223 submits a job to the media integration module 221 in the post processor system 220 and synchronizes elements stored in the machine-readable medium 230, whose facilities are accessed by the media integration module 221 to process the media content. In some example embodiments, the media integration module 221 may integrate the media content captured by the media capture machine 215 with the chat data from the chat server 250. The result is the integrated media content 216. Results of the processing by the media integration module 221 are published and/or archived in the machine-readable medium 230. Results of the processing of the media content can be exported by the media integration module 221.

The architecture 200 is described such that one component (the media production server 205) controls the capture and storage of the media content and the chat data and a second component (the post processor system 220) integrates the media content and chat data. In some other embodiments, these two separate functions may be performed by a same component. For example, the media production server 205 may control the capture and storage of the media content and chat data as well their integration to generate an integrated media content.

Figure 3:
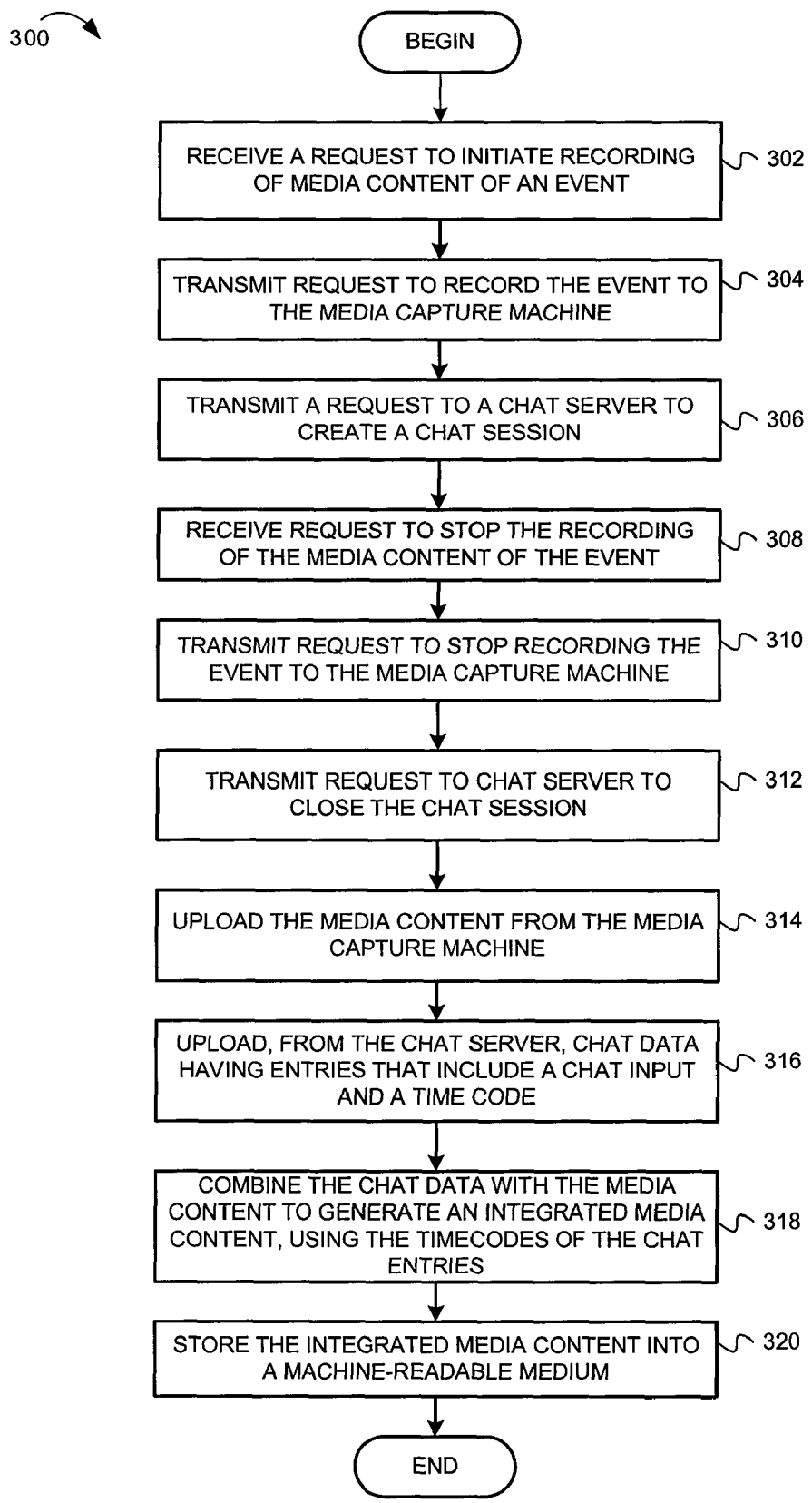
FIG. 3 is a more detailed diagram of chat data that is being integrated with media content, according to some example embodiments.
Figure 5:
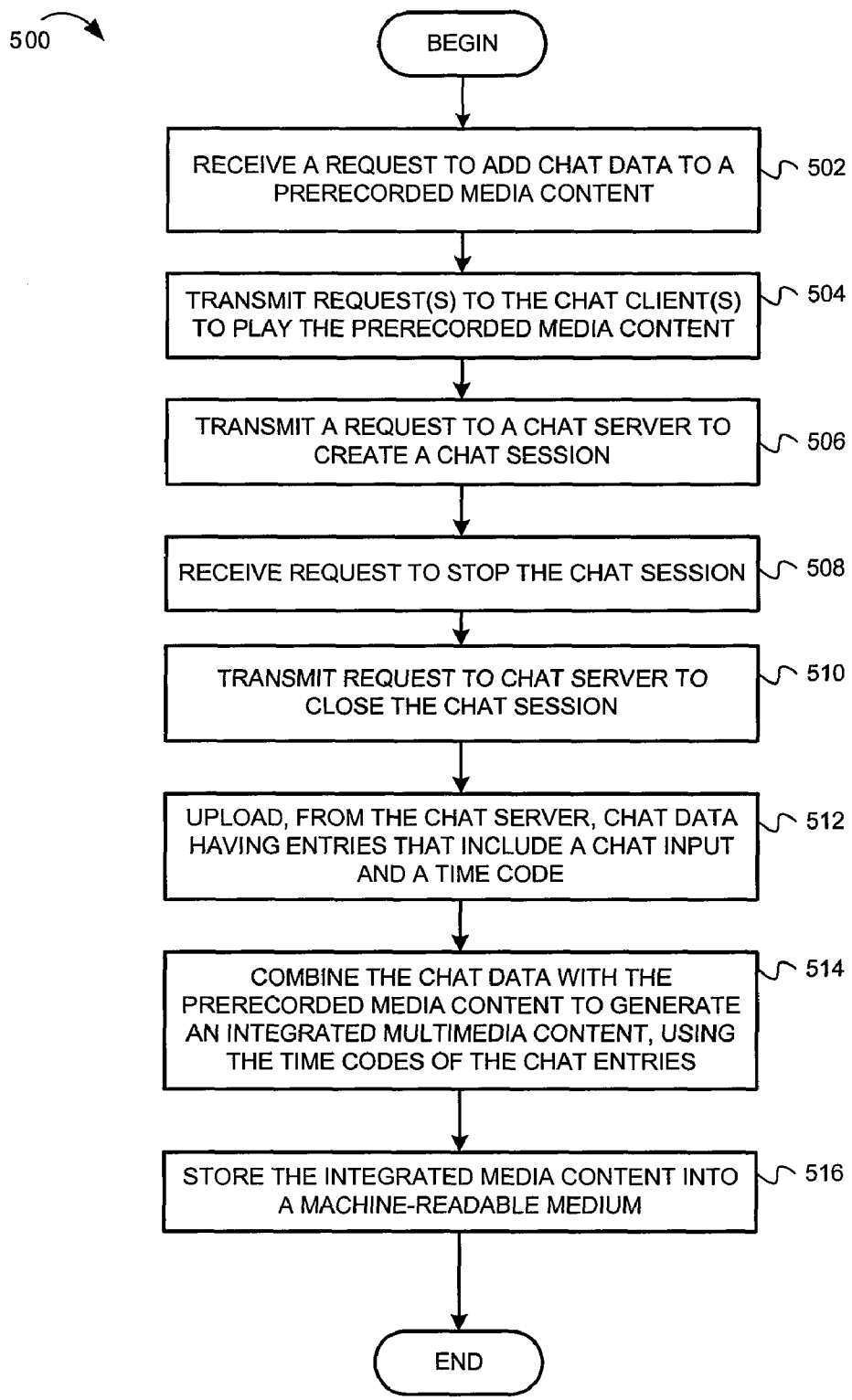
FIG. 5 is a diagram of a method for recording of a chat session among users that are viewing or listening to a playback of recorded media content, according to some example embodiments.

Operations, according to some example embodiments, are now described. In certain embodiments, the operations are performed when instructions residing on machine-readable media (e.g., software) are executed, while in other embodiments, the methods are performed by hardware or other logic (e.g., digital logic). Two methods are described for integrating media content with chat data. FIG. 3 is a diagram of a method for integration wherein the recording of the event and the chat session among persons viewing or listening to the event are occurring essentially in real time, according to some example embodiments. FIG. 5 is a diagram of a method for integration wherein the chat session among the persons viewing or listening occurs after the event has occurred, according to some example embodiments. FIG. 3 is first described.

In particular, FIG. 3 is a diagram of a method for recording of an event and a corresponding chat session in real time and for the integration of such recorded data, according to some example embodiments. The method 300 is described with reference to the components of FIGS. 1-2. The method 300 commences at block 302.

At block 302, the control module 223 of the media production server 205 receives a request to initiate recording of media content of an event. For example, the request may be received from the media client 210. Using an application executing on the media client 210, a user can determine or select an event for which a video recording of the event is to be captured. In addition to the video of the event, the associated audio can be captured with the associated video. Video content, herein, may include audio content associated with the video. Through a graphical user interface of the media client 210 a user can initiate the video recording. The user can supply a set of information for the event. Such information may include local administration credentials, selection of the media capture machine 215 or other audio/video devices to be used, an identification of the media production server 205 to be used, and administration credentials for access to the media production server 205. The media capture machine 215 may accept and perform various commands to stop and start the video capture. An application executing on the media client 210 requests operation of the media capture machine 215 by media production server 205. The method continues at block 304.

At block 304, the control module 223 transmits the request to record the event to the media capture machine 215. The request may be a request to initiate recording at a given time, a request to record for a given time period, etc. The control module 223 may store a start time for recording of the media content. As further described below, this start time may be used to integrate chat data with the media content. This start time may be determined and transmitted by the control module 223 to the media capture machine 215. In some example embodiments, the control module 223 may transmit a control signal to start the recording when the control signal is received. Alternatively, the control signal may provide a start time that is at a later point in time relative to receipt of the control signal by the media capture machine 215. The method continues at block 306.

At block 306, the control module 223 transmits a request to a chat server 250 to create a chat session. In some example embodiments, the request to the chat server 250 may be in response to transmitting the request to record the event. The method 300 illustrates the operations at block 304 are followed by the operations at block 306. However, the request to the media capture machine (at block 304) and the request to the chat server 250 (at block 306) may be transmitted in any order relative to each other. For example, in some example embodiments, the request to the media capture machine may initiate the transmitting of the request to the chat server 250. In some example embodiments, the requests may be transmitted at essentially the same time. As part of the request, the control module 223 may also transmit an indication of whether to execute a chat bot within the chat server 250. As described above, this may enable the chat client(s) 252 to input other type of input (in addition to text) into the chat session. Alternatively, one of the chat client(s) 252 may cause a chat bot to be executed on the chat server 250 as part of the chat session. In some example embodiments, the data input into the chat data is stored at the chat server 250.

The different data input from users of the chat session may be stored in entries into chat data. As further described below, an entry in chat data may include the data, the user who entered the data and a timecode of when the data was input. These timecodes from the chat data may be leveraged to time sync and combine the chat data with the media content that is being viewed or listened to by the persons that are inputting data into the chat session. Any type of chat/instant messenger application may be used. For example, iChat AV from Apple Computer Inc., Messenger from Yahoo Inc., Google Talk from Google, Inc., Windows Live Messenger, American On Line (AOL) Instant Messenger, Skype, .NET Messenger Service, Jabber, ICQ, Gadu-Gadu, Qnext, etc. may be used. The method continues at block 308.

At block 308, the control module 223 receives a request to stop the recording of the media content of the event. For example, the request may be received from the media client 210. In some example embodiments, the control module 223 may not receive this request. Rather, the initial request to start the recording of the event may include a stop time. Accordingly, in some of these embodiments, the operations at block 308 and 310 are not executed. The method continues at block 310.

At block 310, the control module 223 transmits a request to stop recording to the media capture machine 215. The control module 223 may store the stop time for completion of recording of the media content. The method continues at block 312.

At block 312, the control module 223 transmits a request to the chat server 250 to close the chat session. In some example embodiments, this request is closed by the stop of the recording of the media content. Alternatively, the request to close the chat session may be independent of the stopping of the recording of the media content. The control module 223 may initiate the transmission based on a defined time period for the chat session. Alternatively or in addition, the request may be received from one of the chat client(s) 252 or the media client 210. In some example embodiments, the chat session may remain open for a time period after the recording of the media content is complete. For example, if the event is a lecture at an educational institution, the chat session may be among students viewing or listening to the lecture. This additional time may enable the student to exchange information, ask questions of a teaching assistant or the professor presenting the lecture, etc. In response to receiving the request, the chat server 250 closes the chat session. The method continues at block 314.

At block 314, the control module 223 uploads the media content from the media capture machine 215 to the media production server 205. The control module 223 may store the uploaded media content in the machine-readable medium 230. The method continues at block 316.

At block 316, the control module 223 uploads the data from a chat session. The chat data may comprise a number of entries that include the chat input and the timecode of when the chat input was entered into the chat session. The control module 223 may store the uploaded chat data in the machine-readable medium 230. The method continues at block 318.

Figure 4:
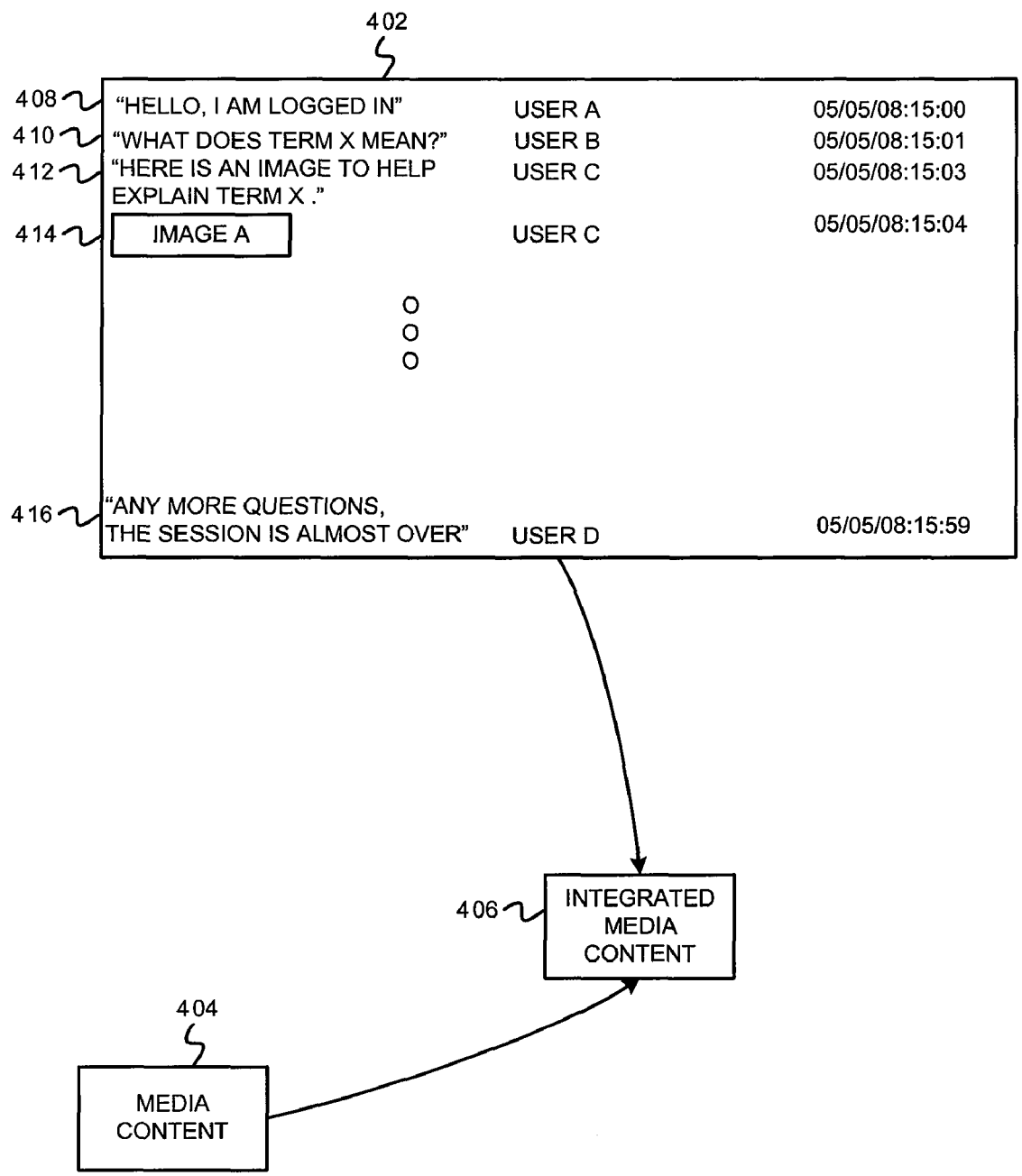
FIG. 4 is a diagram of a method for recording of an event and a corresponding chat session in real time and for the integration of such recorded data, according to some example embodiments.

At block 318, the media integration module 221 in the post processor system 220 combines the chat data with the media content to generate an integrated media content, using the timecodes of the chat entries. To illustrate, FIG. 4 is a more detailed diagram of chat data that is being integrated with media content, according to some example embodiments. FIG. 4 includes chat data 402 that is combined with media data 404 to produce the integrated media content. The chat data 402 includes a number of chat entries (408-416). The chat entries include the data input, the user that input the data and the timecode that is the time of when the data was input. For example, for the chat entry 408, the data input is "Hello, I am logged in"; the user is "user A"; and the timecode is "05/05/2008:15:00". For this example timecode, the date and the time are included—05/05/08 and 15:00, respectively. As shown by the chat entry 414, the data from the user can be data other than text. For example, the data input for the chat entry 414 is an image A. Alternatively or in addition to the image being included, the data input might be a hyperlink, which when selected enables one to access the image. As described above, the data input may be any type of media resource (including video, audio, links to such data, etc.).

As described above, the control module 223 stores a start time for the recording of media content of the event. This start time may be stored in the machine-readable medium 230. The media integration module 221 may access this start time. The media integration module 221 may combine the media content with the chat data using the start time of the media content and the timecodes from the chat entries in the chat data. The start time may be absolute time similar to the timecodes from the chat entries. Thus, the media integration module 221 inserts the chat entry into the media content based on its timecode. With reference to the timecodes of FIG. 4, if the start time for the media content 404 is 05/05/2008:14:59, the chat entry 408 would be inserted into the media content 404 one minute from the start time, the chat entry 410 would be inserted into the media content 404 two minutes from the start time, etc. The media integration module 221 may insert the chat data into the media content by rendering the chat data onto the media content, by storing the data as metadata in the media content, etc. Some examples of the types of integrated media content are set forth below. In some example embodiments, only a subset of the chat entries is combined with the media content. Some type of filtering may be used to determine which chat entries are combined. For example, a user that enters chat input may include specific symbol(s) that indicate that all or part of a chat entry is to be included. There may be specific symbol(s) for starting and stopping the filtering. In some example embodiments, the filtering may be based on certain words (inappropriate words, irrelevant words, etc.) may remove the entire chat entry or a part of a chat entry. Returning to FIG. 3, the method continues at block 320.

At block 320, the media integration module 221 stores the integrated media content into a machine-readable medium. For example, the integrated media content may be stored in the machine-readable medium 230. Alternatively or in addition, the media integration module 221 may broadcast or transmit the data to machine-readable media of other components communicatively coupled to the post processor system 220. For example, the integrated media content may be broadcast to the persons that were part of the chat session. In some example embodiments, the integrated media content may be stored as a podcast. Accordingly, the integrated media content may be transmitted to persons that subscribe to the podcast. Alternatively or in addition, the integrated media content may be accessed from the machine-readable medium 230 by other devices at a later time. The method 300 is complete.

In some example embodiments, the chat session may occur after the media content is recorded. Accordingly, a chat session may occur relative to a playback of a recording of media content of an event. In particular, FIG. 5 is a diagram of a method for recording of a chat session among users that are viewing or listening to a playback of recorded media content, according to some example embodiments. The method 500 is described with reference to the components of FIGS. 1-2. The method 500 commences at block 502.

At block 502, the control module 223 receives a request to add chat data to a prerecorded media content. For example, one of the persons at a chat client 252 who are to be part of the chat session may transmit this request to the media production server 205. This request could identify the specific media content and the identification of the persons to be a part of the chat session. This request could also provide an indication of whether a chat bot is to execute during the chat session to enable different types of data to be included in the chat session (as described above). The method continues at block 504.

At block 504, the control module 223 transmits request(s) to the chat client(s) 252 that are to be included in the chat session to play the prerecorded media content. This request may include a designated start time so that the viewing of the media content is in sync across the different chat client(s) 252. This request may also include the prerecorded media content or an address from which to download the media content. For example, the request may include an address in the machine-readable medium 230 where the prerecorded media content is stored.

At block 506, the control module 223 transmits a request to a chat server 250 to create a chat session. As part of the request, the control module 223 may also transmit an indication of whether to execute a chat bot within the chat server 250. As described above, this may enable the chat client(s) 252 to input other type of input (in addition to text) into the chat session. In some example embodiments, the data input into the chat data is stored at the chat server 250. Also, after the chat session is initiated, the chat server 250 may transmit, to the chat client(s) 252 that are part of the chat session, a control signal to start the playing of the prerecorded media content.

As described above, the different data input from users of the chat session may be stored in entries into chat data. The chat data may include chat data similar to the chat data illustrated in FIG. 4. Also, any type of chat/instant messenger application may be used. For example, iChat AV from Apple Computer Inc., Messenger from Yahoo Inc., Google Talk from Google, Inc., Windows Live Messenger, American On Line (AOL) Instant Messenger, Skype, .NET Messenger Service, Jabber, ICQ, Gadu-Gadu, Qnext, etc. may be used. The method continues at block 508.

At block 508, the control module 223 receives a request to stop the chat session. For example, this request may be from one of the persons that are part of the chat session. After the playback of the media content is complete, one of these persons may send a request to the media production server 205. Alternatively or in addition, this request may be generated in response to completion of the playback of the media content. For example, a component executing on one of the chat client(s) 252 may monitor the playback and transmit this request after playback is complete. Similar to the operations at block 312 of the method 300, in some example embodiments, the chat session may remain open for a time period after the playback of the prerecorded media content is complete. For example, if the event is a lecture at an educational institution, the chat session may be among students viewing or listening to a playback of the lecture. This additional time may enable the student to exchange information, ask questions of a teaching assistant or the professor that presented the lecture, etc. The method continues at block 510.

At block 510, the control module 223 transmits a request to the chat server 250 to close the chat session. In response to receiving the request, the chat server 250 closes the chat session. The method continues at block 512.

At block 512, the control module 223 uploads the data from a chat session. As described above, the chat data may comprise a number of entries that include the chat input and the timecode of when the chat input was entered into the chat session. The control module 223 may store the uploaded chat data in the machine-readable medium 230. The method continues at block 514.

At block 514, the media integration module 221 in the post processor system 220 combines the chat data with the prerecorded media content to generate an integrated media content, using the timecodes of the chat entries. The media integration module 221 may generate the integrated media content using the timecodes of the chat entries, as described above in the description of block 318 of the method 300. The method continues at block 516.

At block 516, the media integration module 221 stores the integrated media content into a machine-readable medium. For example, the integrated media content may be stored in the machine-readable medium 230. Alternatively or in addition, the media integration module 221 may broadcast or transmit the data to machine-readable media of other components communicatively coupled to the post processor system 220. For example, the integrated media content may be broadcast to the persons that were part of the chat session. In some example embodiments, the integrated media content may be stored as a podcast. Accordingly, the integrated media content may be transmitted to persons that subscribe to the podcast. Alternatively or in addition, the integrated media content may be accessed from the machine-readable medium 230 by other devices at a later time. The method 500 is complete.

One application of the method 500 may include the use of a web-based video player that outputs a playback of different video content (e.g., YouTube). An application executing on the hosting website for the web-based video player could receive chat data. For example, this application could receive chat data from some type of chat/instant messenger application and could time code the received chat data with the relative time for the video being played. This application could then send this chat data along with the time code relative to the time of the video to a chat bot application (as described herein). This chat data could be posted as a chat entry.

It should be noted that the methods described herein do not have to be executed in the order described, or in any particular order. Moreover, various activities described with respect to the methods identified herein can be executed in iterative, repetitive, serial, or parallel fashion. Activities within various methods may also be combined, to include combination across the various figures used herein. Information, including parameters, commands, operands, and other data, can be sent and received in the form of one or more carrier waves.

Figure 6:
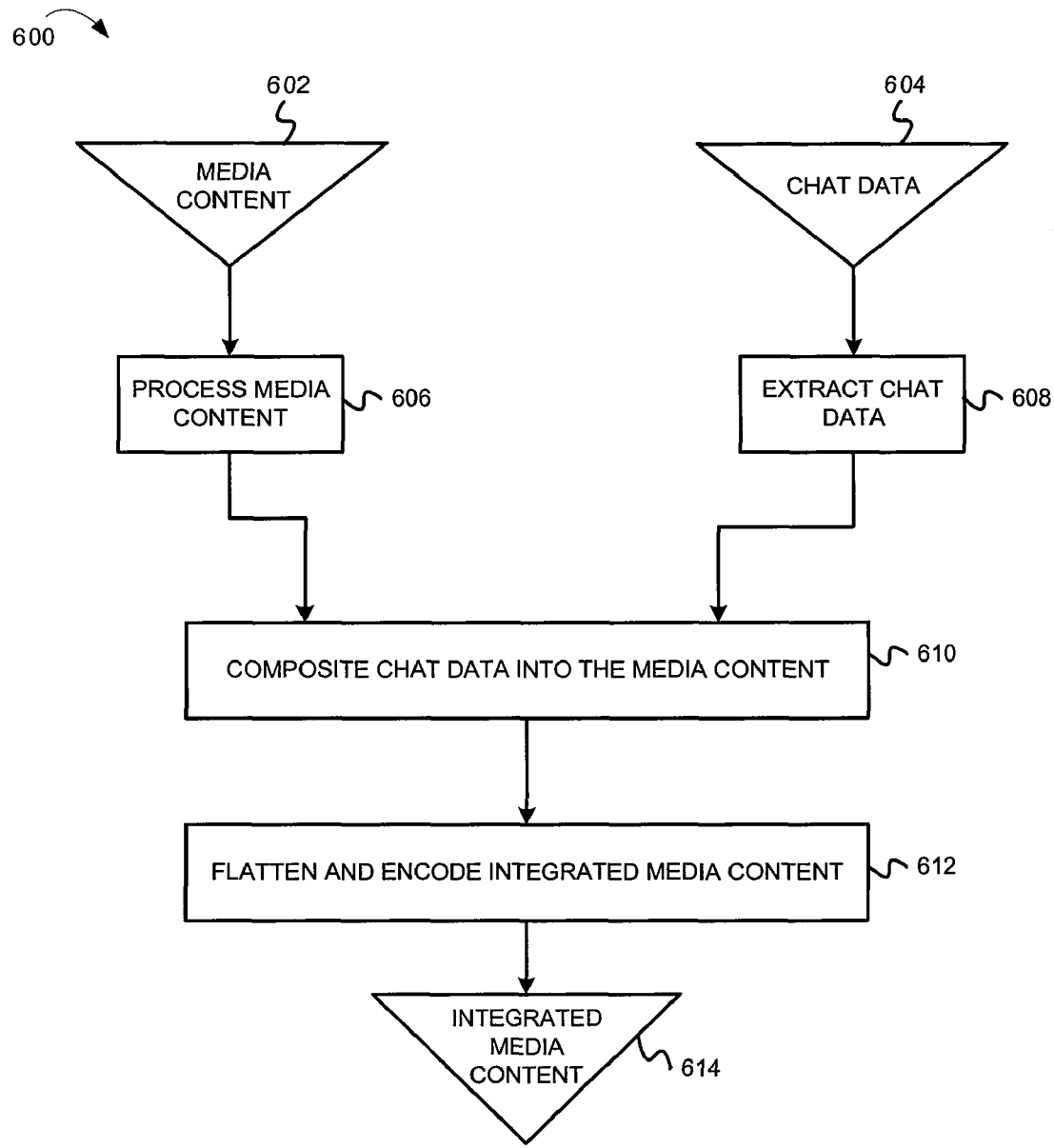
FIG. 6 is a diagram of integration of media content with chat data, where the chat data is rendered onto the media content, according to some example embodiments.

A more detailed description of integration of the media content with chat data is now set forth, according to some example embodiments. FIG. 6 is a diagram for integration of media content with chat data, where the chat data is rendered onto the media content, according to some example embodiments. The operations described herein may be performed by the media integration module 221.

The diagram 600 includes media content 602 and chat data 604 that are processed to output an integrated media content 614. At block 606, the media content is input for processing. At block 608, the chat data is extracted. As described above, the chat entries may be extracted from the chat data for inclusion into the media content based on the timecodes in the chat entries (see description of block 318 of FIG. 3 above).

At block 610, the chat data is composited into the media content. Any type of application may be used for compositing the chat data into the media content. In some example embodiments, Quartz Composer manufactured by Apple Computer, Inc. is used for this composition. Further information concerning the Quartz Composer can be found in the following documents, which are incorporated by reference herein: "Working With Quartz Composer" (published Feb. 13, 2006 at http://developer.apple.com/graphicsimaging/quartz/quartzcomposer.html); "Quartz Composer Programming Guide" (published Jul. 24, 2006). In some example embodiments, compositing may comprise combining the chat data as invisible metadata or linking to a separate file (using for example Synchronized Multimedia Integration Language (SMIL) technology).

As described above, the chat data is inserted at different times within the media content based on the associated timecodes. Accordingly, for a given chat entry, the chat data may be composited into the media content at the time designated by the timecode relative to the time of the media content (see description of block 318 of FIG. 3 above). For example, the chat data may be text, video, etc. that is rendered onto the media content. The result of this operation produces an integrated media content. At block 612, the integrated media content can be flattened and encoded to produce the integrated media content 614.

Figure 7:
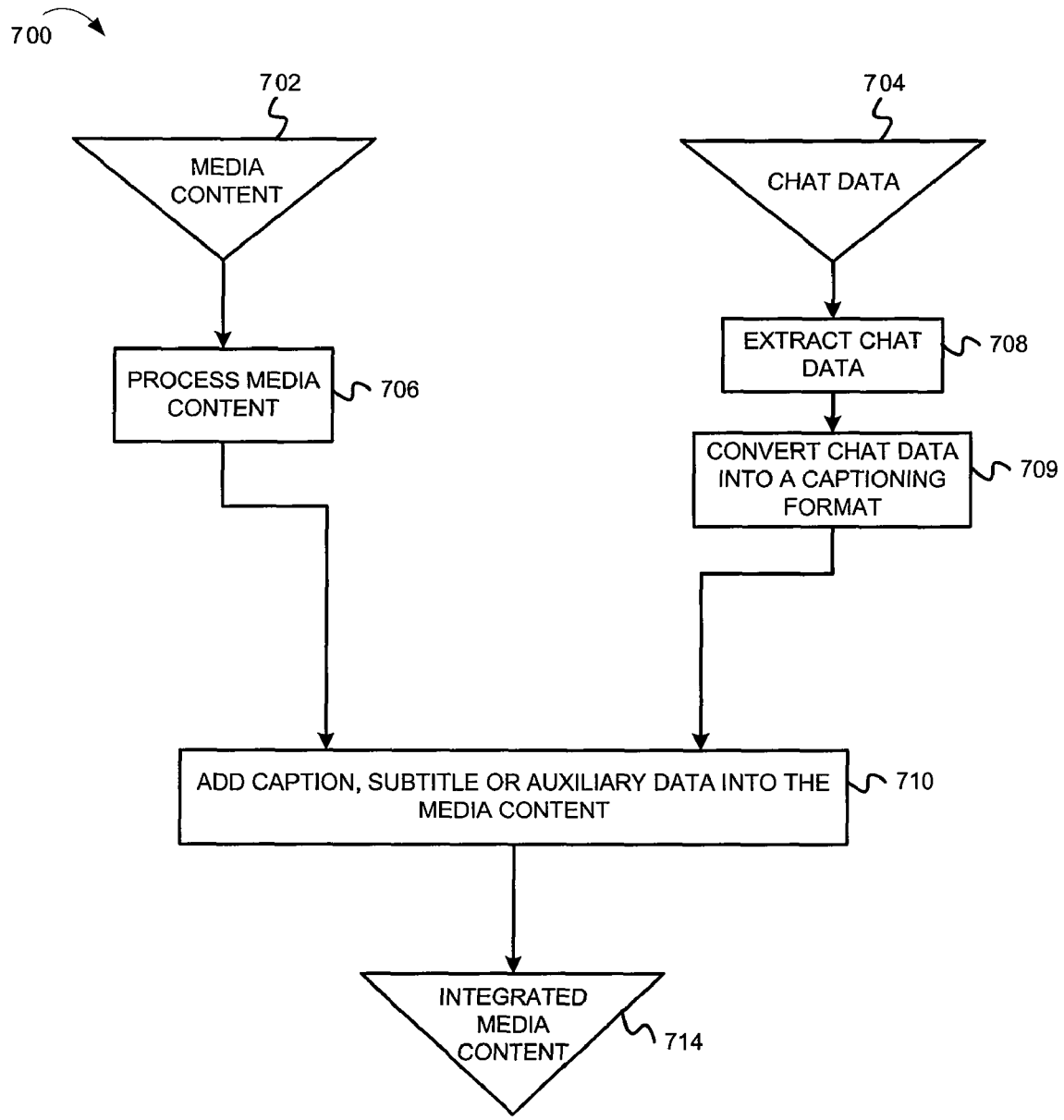
FIG. 7 is a diagram of integration of media content with chat data, where the chat data is stored as captions, subtitles or auxiliary text in the media content, according to some example embodiments.

FIG. 7 is a diagram of integration of media content with chat data, where the chat data is stored as captions, subtitles or auxiliary text in the media content, according to some example embodiments. The operations described herein may be performed by the media integration module 221.

The diagram 700 includes media content 702 and chat data 704 that are processed to output an integrated media content 714. At block 706, the media content is input for processing. At block 708, the chat data is extracted. As described above, the chat entries may be extracted from the chat data for inclusion into the media content based on the timecodes in the chat entries (see description of block 318 of FIG. 3 above). At block 709, the chat data is converted into a captioning format for synchronization of the chat data with the media content. In some example embodiments, the chat data is converted into a captioning format that is in accordance with the Electronic Industries Alliance (EIA)-608 or EIA 708 standards. The data that is converted into a captioning format may come from any data source. In some example embodiments, the chat data may be SMIL-based data. Accordingly, the SMIL-based data may be references to a file or data that is externally to the media content. The SMIL-data may comprise a pointer, reference or address to a separate file or data. In some example embodiments, the integrated media content may be separate files or data that are joined by a playback application when the integrated media content is played back.

At block 710, the converted data is added to the media content to produce the integrated media content. In some example embodiments, the converted data is added into the metadata of the media content. If the converted data includes text, text references or links to the data (such as links to videos, images, etc.), such data is searchable. For example, if the converted data is a transcription of a lecture, the transcription may be searched for certain words so that that data and/or media content can be found and reviewed. In one application, as the integrated media content is being played, a user that is listening or viewing the content may enter a search term. For example, a search window may appear if a user begins typing over the content. After the user inputs the search term, the playback application may forward the content to the next point where the search term is located in the integrated media content. Moreover, entering some type of input (such as selection of the enter key) may cause the playback to jump to the next point in the integrated media content where this search term is found. This may be done to fast forward or reverse to points in the integrated media content where the search term is located (depending on how the playback application is configured or how the user inputs the search term).

While described such that the integrated media content can be one of rendering or storage of data into the metadata of the media content, in some example embodiments, the integrated media content can include both rendering and storage of data into the metadata. For example, the text could be stored as data in the metadata, while images, video, etc. may be rendered into the media content. In another example, chat data from one chat session may be stored as data in the metadata, while chat data from a second chat session may be rendered into the media content.

Figure 8:
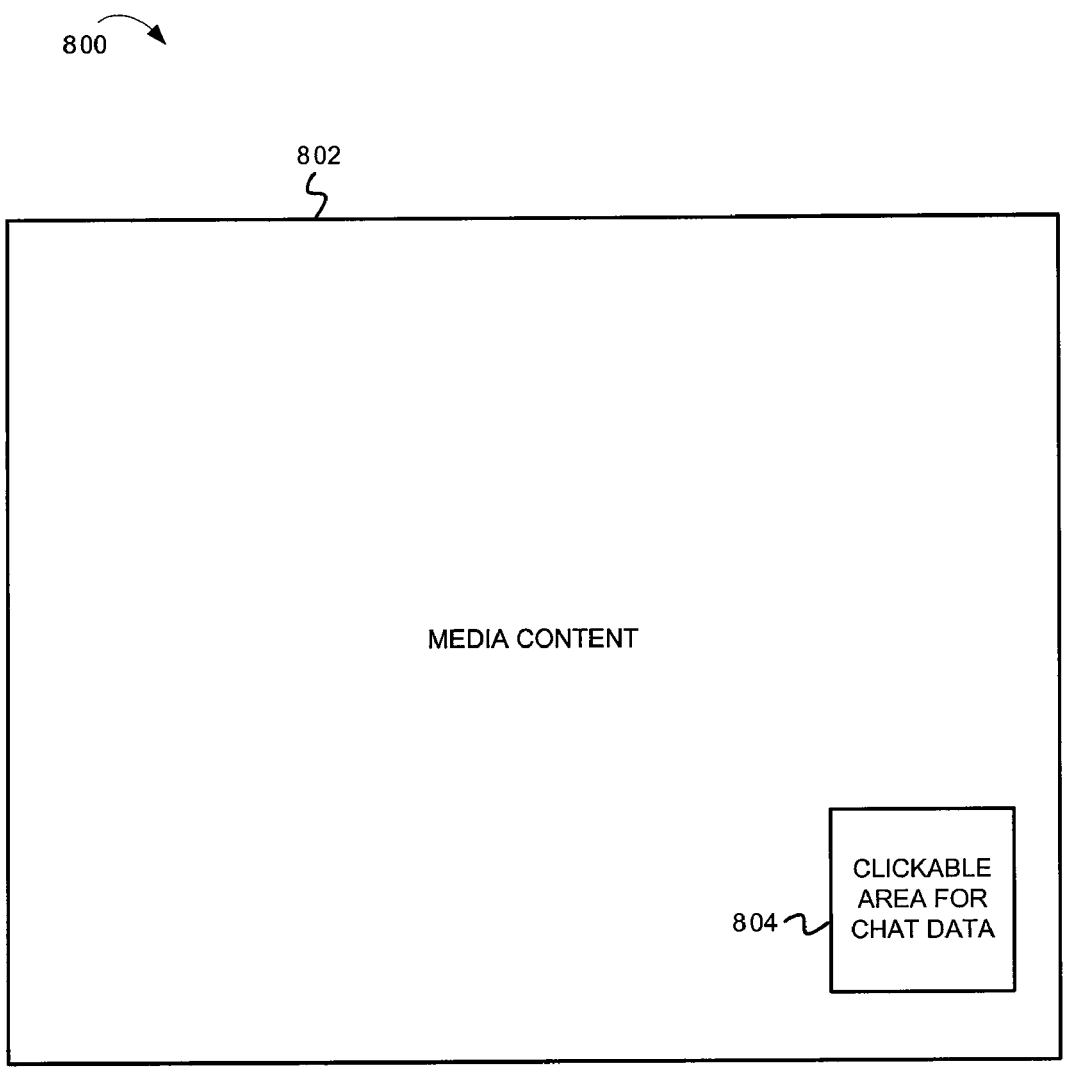
FIG. 8 is a diagrammatic representation of integrated media content that includes a clickable area for chat data, according to some example embodiments.

Example embodiments of integrated media content are now described. FIG. 8 is a diagrammatic representation of integrated media content that includes a clickable area for chat data, according to some example embodiments. The integrated media content 800 includes media content 802 and a clickable area 804 for the chat data. The clickable area 804 may be for chat data that is stored as metadata in the integrated media content 800. The address of the resource may be stored in the metadata of the media content. The clickable area 804 may be some type of icon (e.g., document icon, web link icon, etc.). When the clickable area 804 is selected, the resource associated with the icon could be retrieved. The resource could then be displayed. For example, the resource may be an image, movie, etc. that is retrieved from a remote server for viewing.

Figure 9:
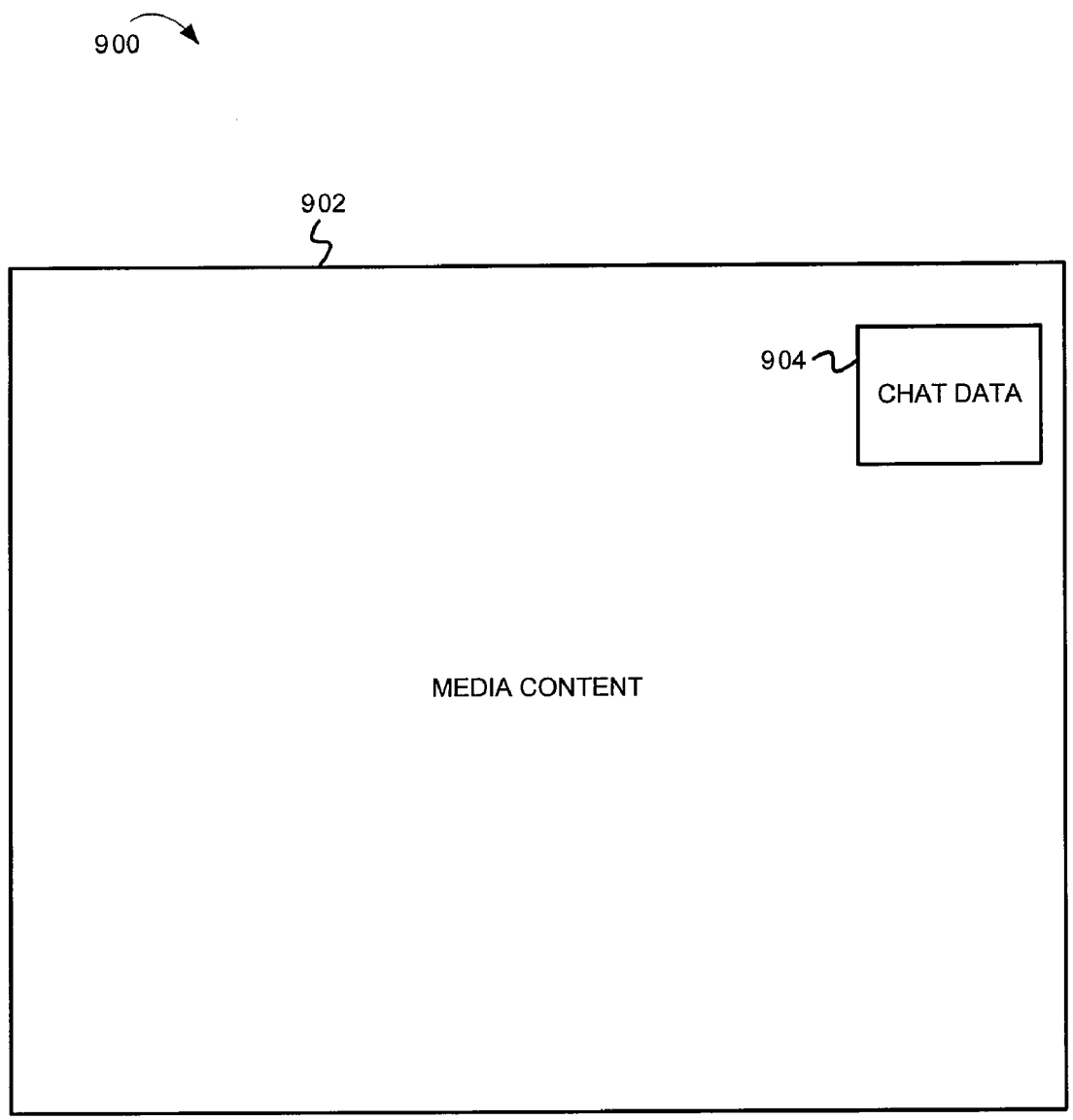
FIG. 9 is a diagrammatic representation of integrated media content that includes chat data being rendered onto the media content, according to some example embodiments.

FIG. 9 is a diagrammatic representation of integrated media content that includes chat data being rendered onto the media content, according to some example embodiments. The integrated media content 900 includes media content 902 and chat data 904. The integrated media content 900 illustrates a picture-in-picture configuration. The media content 902 may be video, and the chat data 904 may be some type of image content. The chat data 904 may be rendered as an overlay onto the media content 902. The chat data 904 may also be a link to an external resource (such as an original uploaded image).

Figure 10:
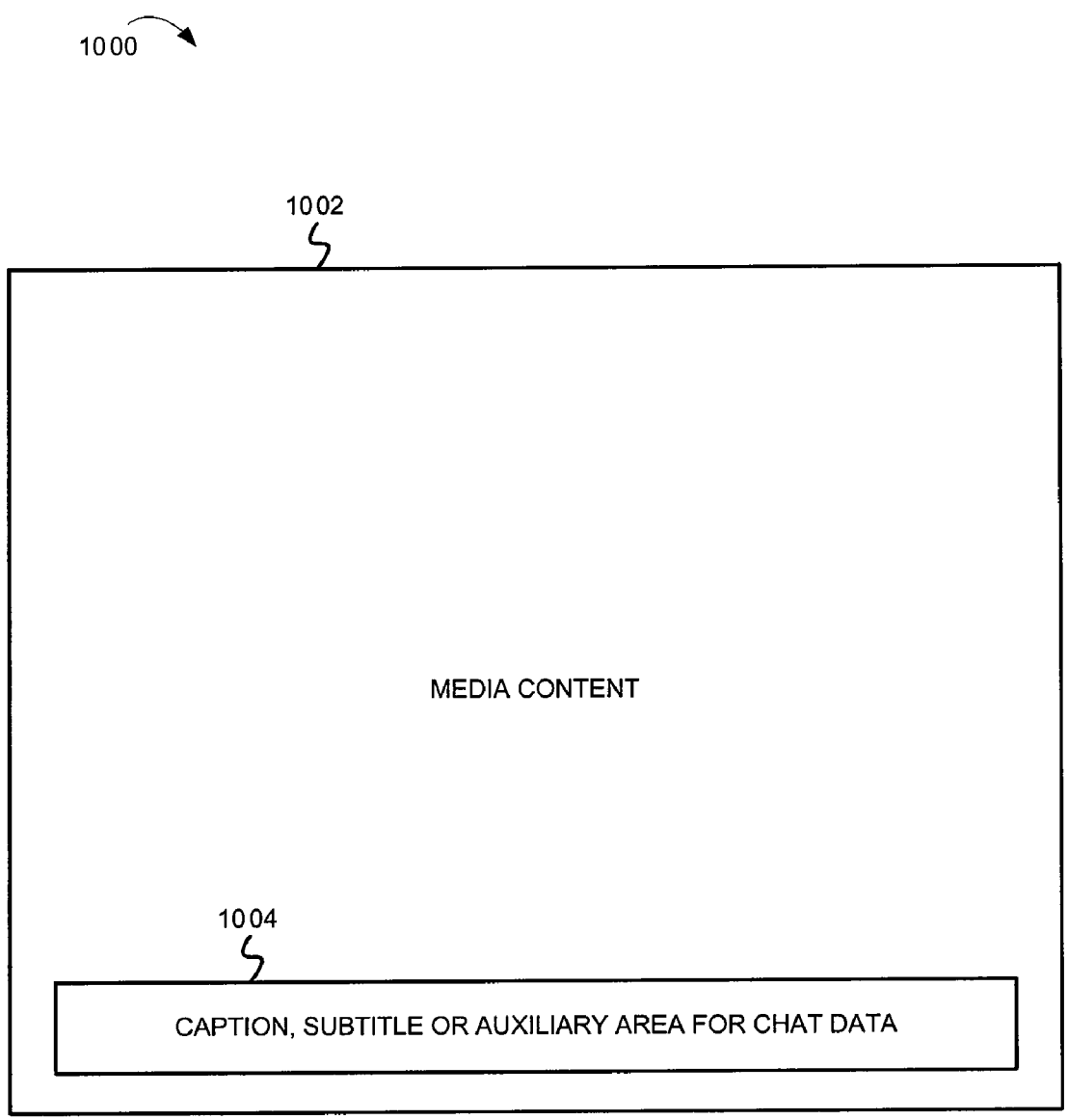
FIG. 10 is a diagrammatic representation of integrated media content that includes chat data as captions, subtitles or auxiliary text in the media content, according to some example embodiments.

FIG. 10 is a diagrammatic representation of integrated media content that includes chat data as captions, subtitles or auxiliary text in the media content, according to some example embodiments. The integrated media content 1000 includes media content 1002 and area 1004 that includes caption, subtitle or auxiliary data. The area 1004 may display open captions or subtitles that may be rendered onto the media content 1002. Alternatively, the area 1004 may display closed captions or subtitles that are from data stored in the metadata of the integrated media content 1000. Accordingly, different captions or subtitles may be selectably overlaid. For example, a viewer of the integrated media content 1000 may select subtitles in a particular language, which is a translation of the audio of the media content 1002. The selected subtitles may be retrieved from the metadata and overlaid onto the media content 1002. Accordingly, various tracks of captions and subtitles (which may be from different chat sessions) can be mutually exclusive, allowing the viewer to select among the tracks.

FIGS. 8-10 are different diagrammatic representations of integrated media content. These different diagrammatic representations may be combined in any combination. For example, the clickable area 804, the chat data 904 and the area 1004 may be included in a same integrated media content. In another example, the chat data 904 and the area 1004 for caption and subtitles may be included in a same integrated media content.

Figure 11:
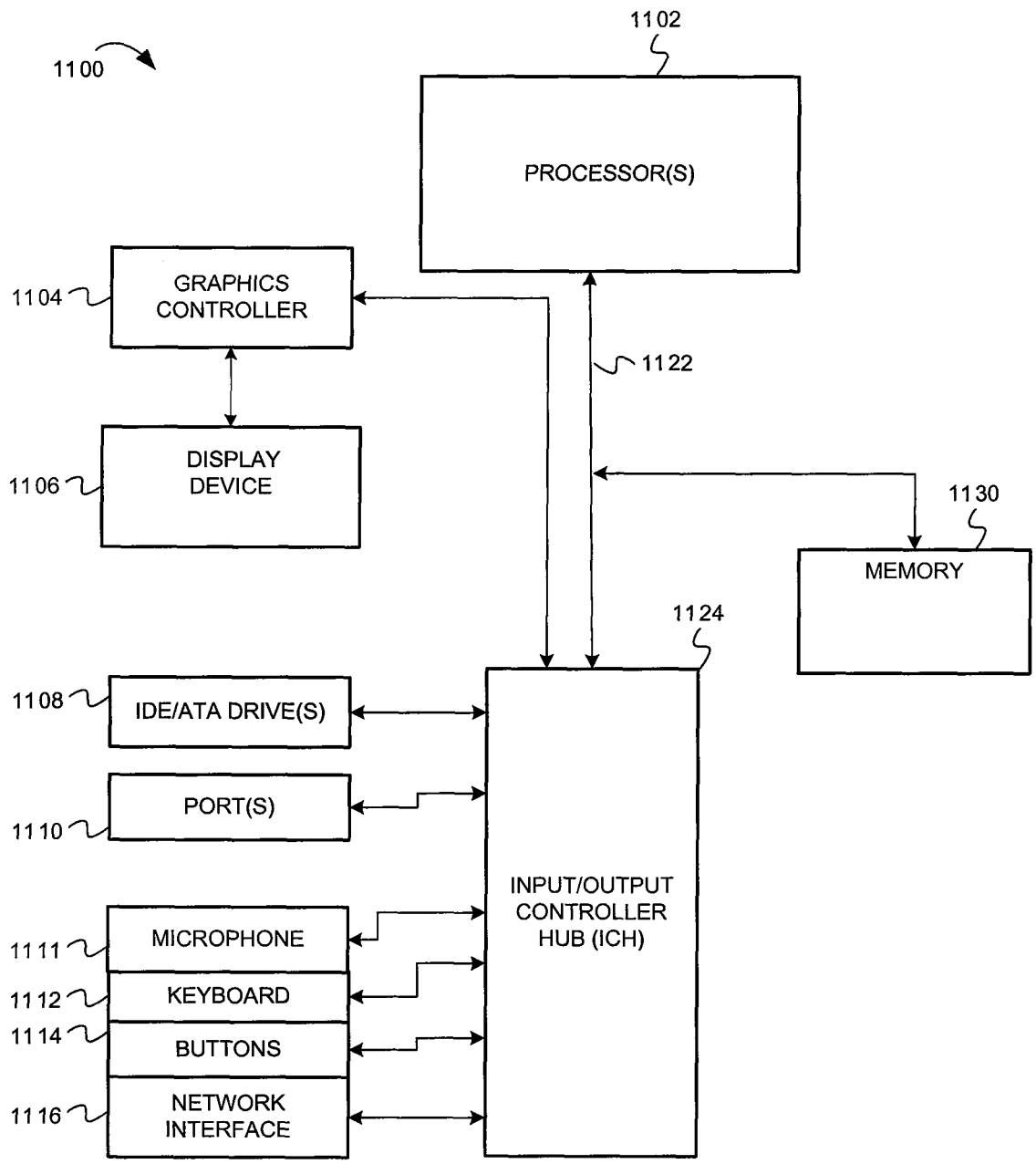
FIG. 11 illustrates a computer that may be used for integration of chat data with captured media content, according to some example embodiments.

A detailed block diagram of an example computer environment, according to some embodiments, is now described. In particular, FIG. 11 illustrates a computer that may be used for integration of chat data with captured media content, according to some example embodiments. A computer system 1100 may be representative of the media production server 102, the chat server 106, the media client 112, the media capture machine 110 or one of the chat client(s) 108.

As illustrated in FIG. 11, the computer system 1100 comprises processor(s) 1102. The computer system 1100 also includes a memory unit 1130, processor bus 1122, and Input/Output controller hub (ICH) 1124. The processor(s) 1102, memory unit 1130, and ICH 1124 are coupled to the processor bus 1122. The processor(s) 1102 may comprise any suitable processor architecture. The computer system 1100 may comprise one, two, three, or more processors, any of which may execute a set of instructions to implement the various method embodiments of the invention.

The memory unit 1130 may store data and/or instructions, and may comprise any suitable memory, such as a dynamic random access memory (DRAM). The computer system 1100 also includes IDE drive(s) 1108 and/or other suitable storage devices. A graphics controller 1104 controls the display of information on a display device 1106, according to some embodiments of the invention.

The input/output controller hub (ICH) 1124 provides an interface to I/O devices or peripheral components for the computer system 1100. The ICH 1124 may comprise any suitable interface controller to provide for any suitable communication link to the processor(s) 1102, memory unit 1130 and/or to any suitable device or component in communication with the ICH 1124. For one embodiment of the invention, the ICH 1124 provides suitable arbitration and buffering for each interface.

For some embodiments of the invention, the ICH 1124 provides an interface to one or more suitable integrated drive electronics (IDE) drives 1108, such as a hard disk drive (HDD) or compact disc read only memory (CD ROM) drive, or to suitable universal serial bus (USB) devices through one or more USB ports 1110. For one embodiment, the ICH 1124 also provides an interface to a keyboard 1112, a mouse 1114, a CD-ROM drive 1118, one or more suitable devices through one or more FireWire® ports 1116. For one embodiment of the invention, the ICH 1124 also provides a network interface 1120 though which the computer system 1100 can communicate with other computers and/or devices.

In some embodiments, the computer system 1100 includes a machine-readable medium that stores a set of instructions (e.g., software) embodying any one, or all, of the methodologies for described herein. Furthermore, software may reside, completely or at least partially, within memory unit 1130 and/or within the processor(s) 1102.

In the description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that embodiments of the invention may be practiced without such specific details. In other instances, control structures, gate level circuits and full software instruction sequences have not been shown in detail in order not to obscure the embodiments of the invention. Those of ordinary skill in the art, with the included descriptions will be able to implement appropriate functionality without undue experimentation.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Embodiments of the invention include features, methods or processes that may be embodied within machine-executable instructions provided by a machine-readable medium. A machine-readable medium includes any mechanism which provides (i.e., stores and/or transmits) information in a form accessible by a machine (e.g., a computer, a network device, a personal digital assistant, manufacturing tool, any device with a set of one or more processors, etc.). In example embodiments, a machine-readable medium includes volatile and/or non-volatile media (e.g., read only memory (ROM), random access memory (RAM), magnetic disk storage media, optical storage media, flash memory devices, etc.).

Such instructions are utilized to cause a general or special purpose processor, programmed with the instructions, to perform methods or processes of the embodiments of the invention. Alternatively, the features or operations of embodiments of the invention are performed by specific hardware components which contain hard-wired logic for performing the operations, or by any combination of programmed data processing components and specific hardware components. Embodiments of the invention include software, data processing hardware, data processing system-implemented methods, and various processing operations, further described herein.

In view of the wide variety of permutations to the embodiments described herein, this detailed description is intended to be illustrative only, and should not be taken as limiting the scope of the invention. What is claimed as the invention, therefore, is all such modifications as may come within the scope and spirit of the following claims and equivalents thereto. Therefore, the specification and drawings are to be regarded in an illustrative rather than a restrictive sense.

What is claimed is:

1. A computerized method comprising:
 receiving, at a production server, a request to initiate recording of media content of an event;
 controlling capturing of the media content by a capture machine in response to the received request;
 opening, at a chat server, a chat session among one or more persons that are listeners or viewers of the event being captured, wherein the opening is in response to the request to initiate recording of the media content, the chat session comprising one or more entries that include a chat input from the one or more persons and a timecode of the chat input;

receiving, at the production server, a request to stop recording of the media content of the event; and combining, at a post processor system, at least a subset of the one or more entries of the chat session with the media content based, at least in part, on the time code of the one or more entries to generate a combined video content, the combining including storing, in a machine readable medium, at least the subset of the one or more entries of the chat data as caption data of the media content.

2. The computerized method of claim 1, wherein combining of at least the subset of the one or more entries with the media content occurs after the event is complete and the chat session is closed.

3. The computerized method of claim 1, wherein the one or more entries of the chat session comprises a transcription of audio of the event.

4. The computerized method of claim 1, further comprising transmitting invite requests to the chat session to client devices of the one or more persons, wherein the transmitting is in response to the request to initiate the recording of the media content.

5. The computerized method of claim 1, wherein storing at least a subset of the one or more entries of the chat session as caption data within the media content comprises storing at least a subset of the one or more entries into metadata of the media content.

6. The computerized method of claim 1, wherein the media content comprises video data.

7. The computerized method of claim 1, wherein the chat input comprises at least one of an image or a video.

8. The computerized method of claim 1, further comprising closing the chat session, in response to the request to stop recording.

9. The computerized method of claim 8, wherein closing the chat session is also in response to all of the one or more persons leaving the chat session.

10. The computerized method of claim 1, wherein at least part of the chat session is open during a time when the event is occurring.

11. The computerized method of claim 1, wherein the integrated video content comprises a plurality of video frames and at least one of said video frames comprises rendered video data of both the media content and the chat data.

12. A system comprising:
a production server comprising at least one processor, configured to initiate recording of media content of an event in response to a request;
a media capture machine configured to capture the media content under the control of the production server;
a first server comprising at least a first processor, and configured to initiate an opening of a chat session in response to initiation of the recording of the event into the media content, the chat session among one or more persons that are at least one of a listener or a viewer of the event, wherein chat data is recorded in response to the opening of the chat session, the chat data comprising one or more entries that include a chat input from the one or more persons and a timecode of the chat input; and
a second server comprising at least a second processor, and configured to combine, based at least in part on the time code of the one or more entries, the media content with at least a subset of the one or more entries of the chat data to generate an integrated video content with at least a subset of the entries of the chat data stored as caption data of the media content.

13. The system of claim 12, wherein the media content is time synced with at least a subset of the one or more entries of the chat data using the time code of the one or more entries.

14. The system of claim 12, wherein the second server is configured to combine the media content with at least a subset of the one or more entries of the chat data after the event is complete and the chat session is closed.

15. The system of claim 12, wherein the one or more entries of the chat session comprises a transcription of audio of the event.

16. The system of claim 12, wherein the chat input comprises at least one of an image or a video.

17. The system of claim 12, wherein the integrated video content comprises a plurality of video frames and at least one of said video frames comprises rendered video data of both the media content and the chat data.

* * * * *